(12) United States Patent
Ross

(10) Patent No.: US 9,026,991 B2
(45) Date of Patent: May 5, 2015

(54) CUSTOMIZABLE FINANCIAL INSTITUTION APPLICATION INTERFACE

(75) Inventor: Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 661 days.

(21) Appl. No.: 13/030,597

(22) Filed: Feb. 18, 2011

(65) Prior Publication Data

US 2012/0216175 A1     Aug. 23, 2012

(51) Int. Cl.
*G06F 9/44*         (2006.01)

(52) U.S. Cl.
CPC ... *G06F 8/20* (2013.01); *G06F 8/30* (2013.01)

(58) Field of Classification Search
USPC ............................................ 717/109; 705/42
See application file for complete search history.

(56) References Cited

U.S. PATENT DOCUMENTS

| | | | |
|---|---|---|---|
| 8,280,787 B1 | 10/2012 | Gandhi | |
| 8,341,057 B1 * | 12/2012 | Wagner et al. | 705/36 R |
| 2001/0034618 A1 | 10/2001 | Kessler et al. | |
| 2002/0023108 A1 | 2/2002 | Daswani et al. | |
| 2002/0156710 A1 * | 10/2002 | Ryder | 705/35 |
| 2003/0028459 A1 * | 2/2003 | Hillel | 705/36 |
| 2003/0208562 A1 | 11/2003 | Hauck et al. | |
| 2005/0037735 A1 | 2/2005 | Coutts | |
| 2006/0253320 A1 | 11/2006 | Heywood | |
| 2006/0253321 A1 | 11/2006 | Heywood | |
| 2007/0239523 A1 | 10/2007 | Yi | |
| 2008/0046868 A1 | 2/2008 | Tsantilis | |
| 2008/0208689 A1 | 8/2008 | Johnson et al. | |
| 2009/0100377 A1 * | 4/2009 | Miyamoto et al. | 715/810 |
| 2009/0106118 A1 * | 4/2009 | Pelegero et al. | 705/26 |
| 2009/0313601 A1 * | 12/2009 | Baird et al. | 717/106 |
| 2009/0313619 A1 | 12/2009 | Parthasarathy et al. | |
| 2010/0010908 A1 | 1/2010 | Pasupulati et al. | |
| 2010/0161467 A1 | 6/2010 | Ageenko et al. | |
| 2010/0325202 A1 | 12/2010 | Rehtijarvi | |
| 2011/0107103 A1 | 5/2011 | Dehaan et al. | |
| 2011/0112950 A1 | 5/2011 | Haggerty et al. | |

FOREIGN PATENT DOCUMENTS

WO      WO 03/069534 A2     8/2003

OTHER PUBLICATIONS

International Preliminary Report on Patentability with Written Opinion for corresponding International Application No. PCT/US2012/025494 dated Aug. 21, 2013; 6 pages.

* cited by examiner

*Primary Examiner* — Hang Pan
(74) *Attorney, Agent, or Firm* — Michael A. Springs; Moore & Van Allen PLLC; Nicholas C. Russell

(57) ABSTRACT

Embodiments of the invention are directed to a system, method, or computer program product for a customizable financial application. This invention allows a user to customize an application, such as an application for a mobile smart phone, to display information or perform actions using data stored by a financial institution, including data about the customer and more general financial data.

27 Claims, 10 Drawing Sheets

APPLICATION SET-UP INTERFACE 600

WELCOME TO FINANCIAL INSTITUTION – CUSTOMIZED APPLICATION START-UP

CREATE A CUSTOMIZED APPLICATION TAILORED TO YOUR FINANCIAL NEEDS.

CREATE USERNAME/PASSWORD 602

ENTER A USERNAME 604

CREATE YOUR PASSWORD 608

ENTER YOUR EMAIL ADDRESS 606

RE - ENTER YOUR PASSWORD 610

ACCOUNT INFORMATION 612

ACCOUNTS WITH US 614
- ☐ CHECKING ACCOUNT #4334 XXXX
- ☐ SAVINGS ACCOUNT #6666 XXXX
- ☐ BROKERAGE ACCOUNT #4334 XXXX
- ☐ CREDIT CARD #6676 XXXX
- ☐ MORTGAGE ACCOUNT #2466 XXXX

OTHER ACCOUNT – NOT LISTED

ACCOUNTS WITH OTHER FIRMS 616
- CHECKING ACCOUNT
- SAVINGS ACCOUNT
- BROKERAGE ACCOUNT
- CREDIT CARD
- MORTGAGE
- CUSTOM

ACCOUNT NAME 618

ACCOUNT NUMBER 620

630 → [ADD]

MERCHANT APPLICATION SET-UP INTERFACE 800

WELCOME TO FINANCIAL INSTITUTION – CUSTOMIZED APPLICATION START-UP

CREATE A CUSTOMIZED APPLICATION TAILORED TO YOUR BUSINESS NEEDS.

CREATE USERNAME/PASSWORD 802

ENTER MERCHANT NAME 804

CREATE YOUR PASSWORD 806

RE - ENTER YOUR PASSWORD 808

ACCOUNT INFORMATION 810

| ACCOUNTS WITH US 812 | ACCOUNTS WITH OTHER FIRMS 814 |
|---|---|
| ☐ CHECKING ACCOUNT #1234 XXXX | CHECKING ACCOUNT |
| ☐ BUSINESS ACCOUNT #5555 XXXX | BUSINESS ACCOUNT |
| ☐ BROKERAGE #4321 XXXX | BROKERAGE |
| ☐ EXPENSE ACCOUNT #9999 XXXX | EXPENSE ACCOUNT |
| ☐ CREDIT ACCOUNT #8888 XXXX | CREDIT ACCOUNT |
| OTHER ACCOUNT – NOT LISTED | CUSTOM |

ACCOUNT NAME 816

ACCOUNT NUMBER 818

830 → ADD

CUSTOMIZABLE FINANCIAL INSTITUTION APPLICATION INTERFACE

BACKGROUND

Downloadable applications (i.e., "apps") for electronic devices such as smart phones, personal digital assistants ("PDAs"), and other hand held electronic devices, have become popular amongst owners of these devices for providing a range of useful and entertaining tools. There are tens of thousands or even hundreds of thousands of downloadable applications available to customers. Studies have shown that nearly half of a person's time on a smart phone is used on non-talking activities, such as texting and using applications. The applications available allow a customer to customize his electronic device with the applications that the customer finds most relevant to his needs. Some applications available to the customer include, but are not limited to applications that the customer can use to check the news, check sports scores, make grocery lists, track a diet, get the weather, check stocks, play games, etc. The customer may download an application onto an electronic device and utilize the features of the application instantly. In view of these demand for such applications, there's always a need for new types of applications.

BRIEF SUMMARY

Embodiments of the present invention address the above needs and/or achieve other advantages by providing apparatuses (e.g., a system, computer program product and/or other devices) and methods for a customizable financial institution application which allows a customer to create a unique interface depending on the customer's specifications. In some embodiments the interface is created via customer input of data and through access to information captured by one or more financial institutions. In some embodiment the interface may compare the customer's financial information with financial information of like situated peers.

Embodiments of the invention allow a customized application to be developed based at least in part on customer requests. The customer may request customer data relating to information regarding the customer's own accounts, and/or other customer data relating to information regarding the accounts of other customers. The customer data may be provided through customer input, and may relate to accounts, such as but not limited to credit card account, checking account, savings account, investment accounts, retirement accounts, etc. Customer data may also be related to accounts that the customer has with various businesses, such as but not limited to credit cards accounts with other business, financial accounts with other financial institutions, mortgages and/or loans. Customer data may further be related to customized data, such as spending goals, savings goals, retirement plans, payment plans, etc. Customer data may further be related to data regarding the customer's social networking, including groups and/or likes that the customer has. Customer data may further be related to customer geographic. In other embodiments the customer data may be provided automatically by the financial institution using financial institution account databases.

The customer may request to add other customer data to the application. In some embodiments other customer data may include data from a representative group of other customers based on the other customers' yearly income, age, residence, mortgages, savings, loans, family members, financial goals, social networking similarities, etc. For example, a customer may want to compare his current retirement savings to other customers' retirement savings that are similarly positioned in age and yearly income.

The customer may select a format for the interface presentment. The format may be a pre-established template for the interface, a completely customized template, or a combination of a pre-established template and a customized template. The pre-established templates comprise commonly used formats for the interface. For example, the templates may be directed to budgeting, financial goals, account management, comparison, etc.

Embodiments of the invention relate to systems, methods, and computer program products for receiving a request from a customer to access customer data; receiving a request from the customer to develop a customized interface; developing the customized interface based at least in part on the customer data, though the use of a processing device; and displaying the customized interface to the customer.

In further accord with an embodiment of the invention, the invention further comprises receiving a request from the customer to access other customer data; and wherein the customized interface is developed based at least in part on the other customer data.

In another embodiment of the invention, the invention further comprises receiving a request from the customer to add customized information; and wherein the customized interface is developed based at least in part on the other customized information. In yet another embodiment of the invention, the customized information is a goal that the customer wants to track using the customized interface.

In still another embodiment of the invention, the invention further comprises receiving a request from the customer to utilize a template; and wherein the customized interface is developed based at least in part on the template.

In further accord with an embodiment of the invention, the invention further comprises receiving a request from the customer to customize a template; and wherein the customized interface is developed based at least in part on the customized template.

In another embodiment of the invention, the invention further comprises saving the customized interface on a customized application system; and receiving a request from a customer to view the customized interface on a customer system.

In yet another embodiment of the invention, the invention further comprises saving the customized interface on a customer system; and receiving a request from the customer system to update the customized interface.

In still another embodiment of the invention, the invention further comprises accessing the customer data from a primary financial institution. In further accord with an embodiment of the invention, the invention further comprises accessing the customer data from a secondary financial institution.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
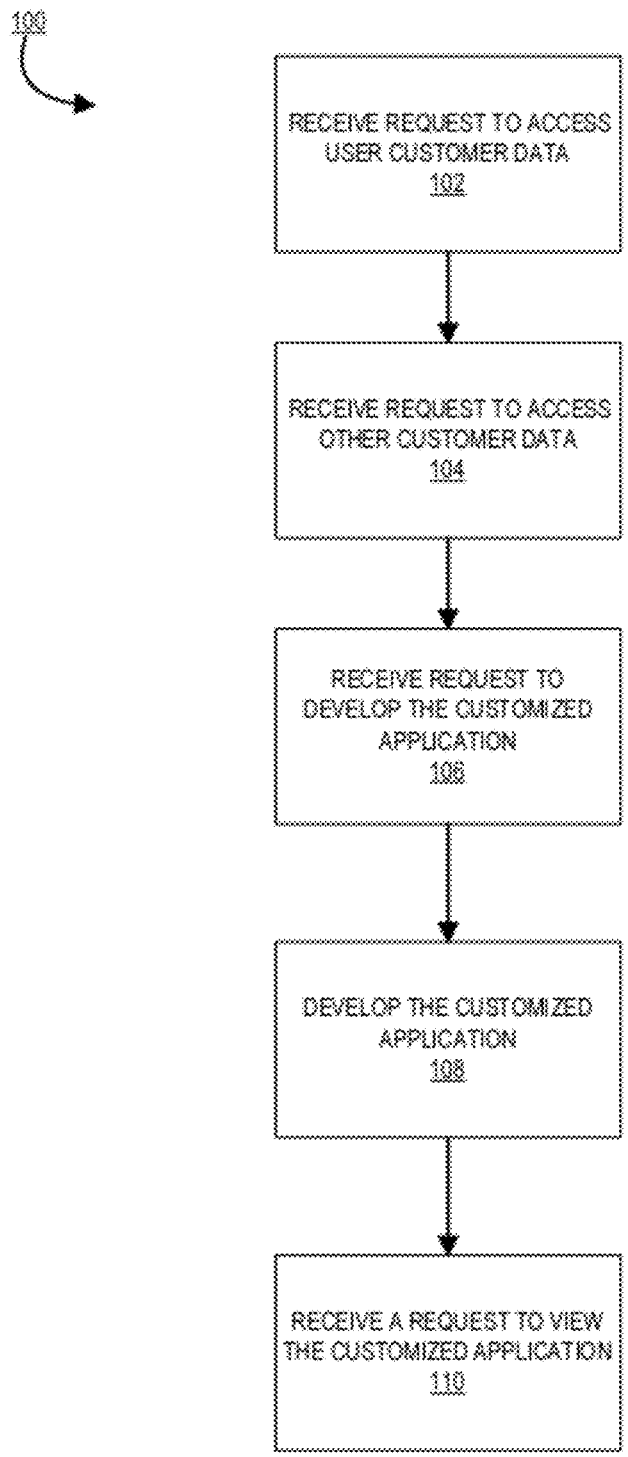
Figure 2:
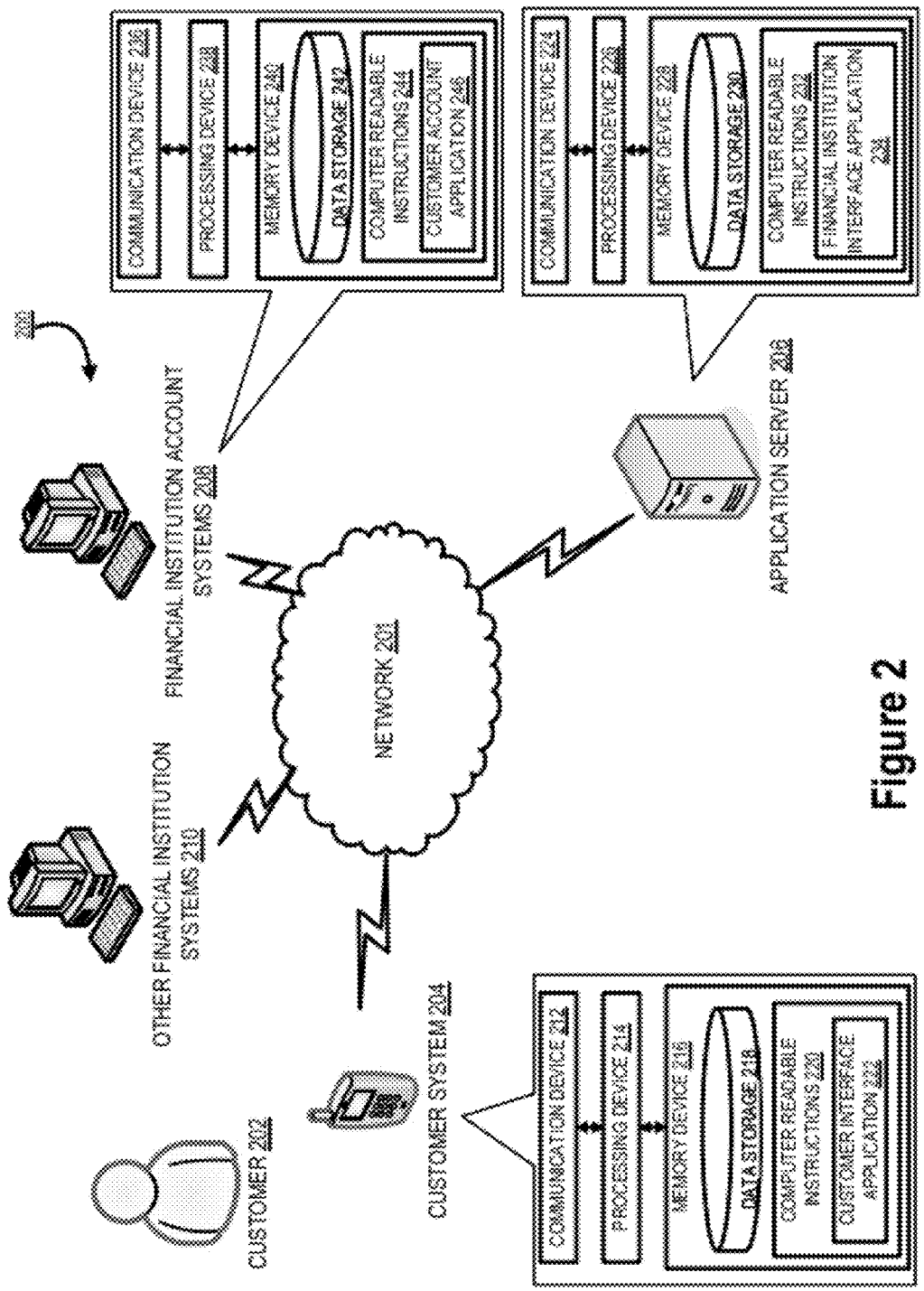
Figure 3:
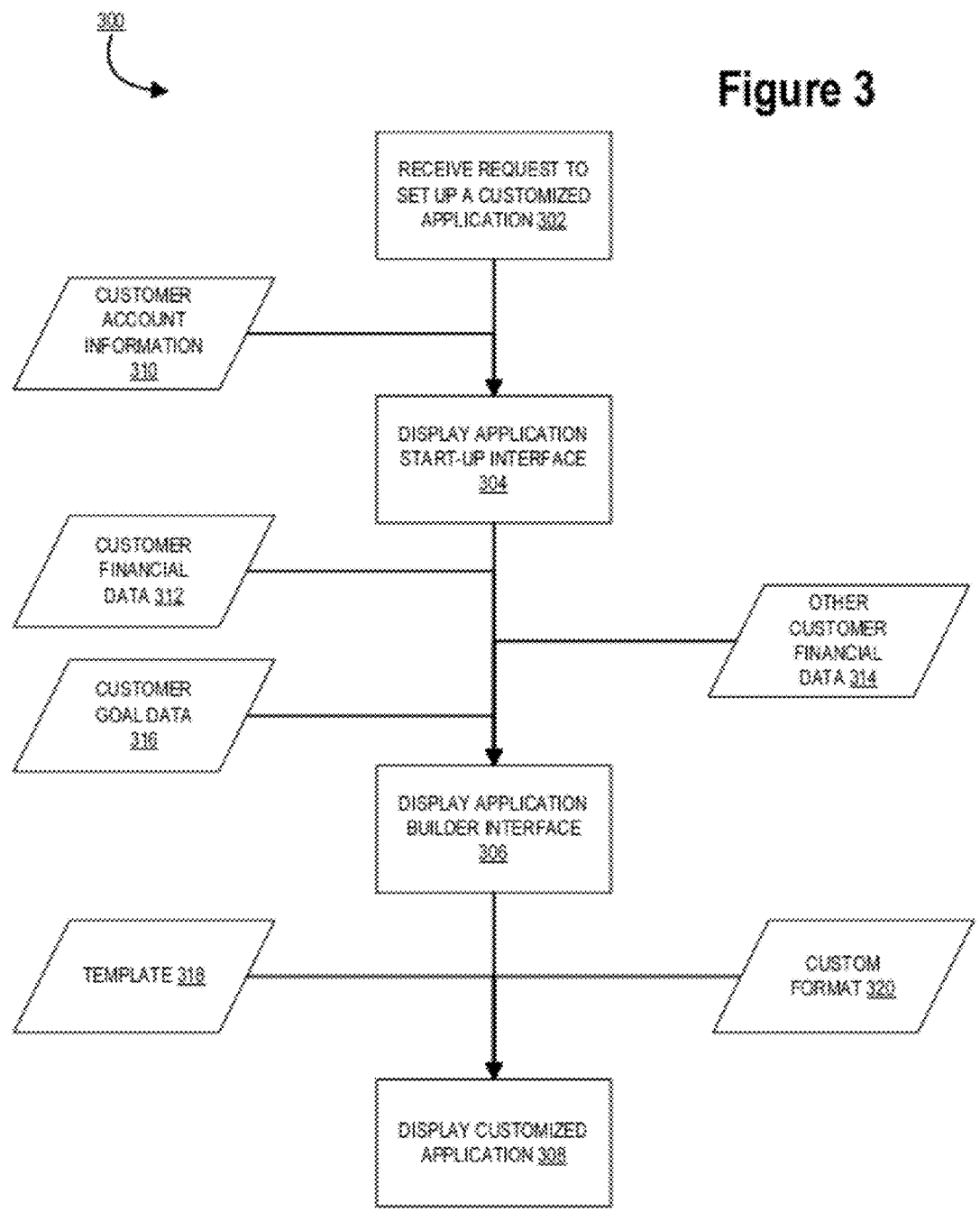
Figure 4:
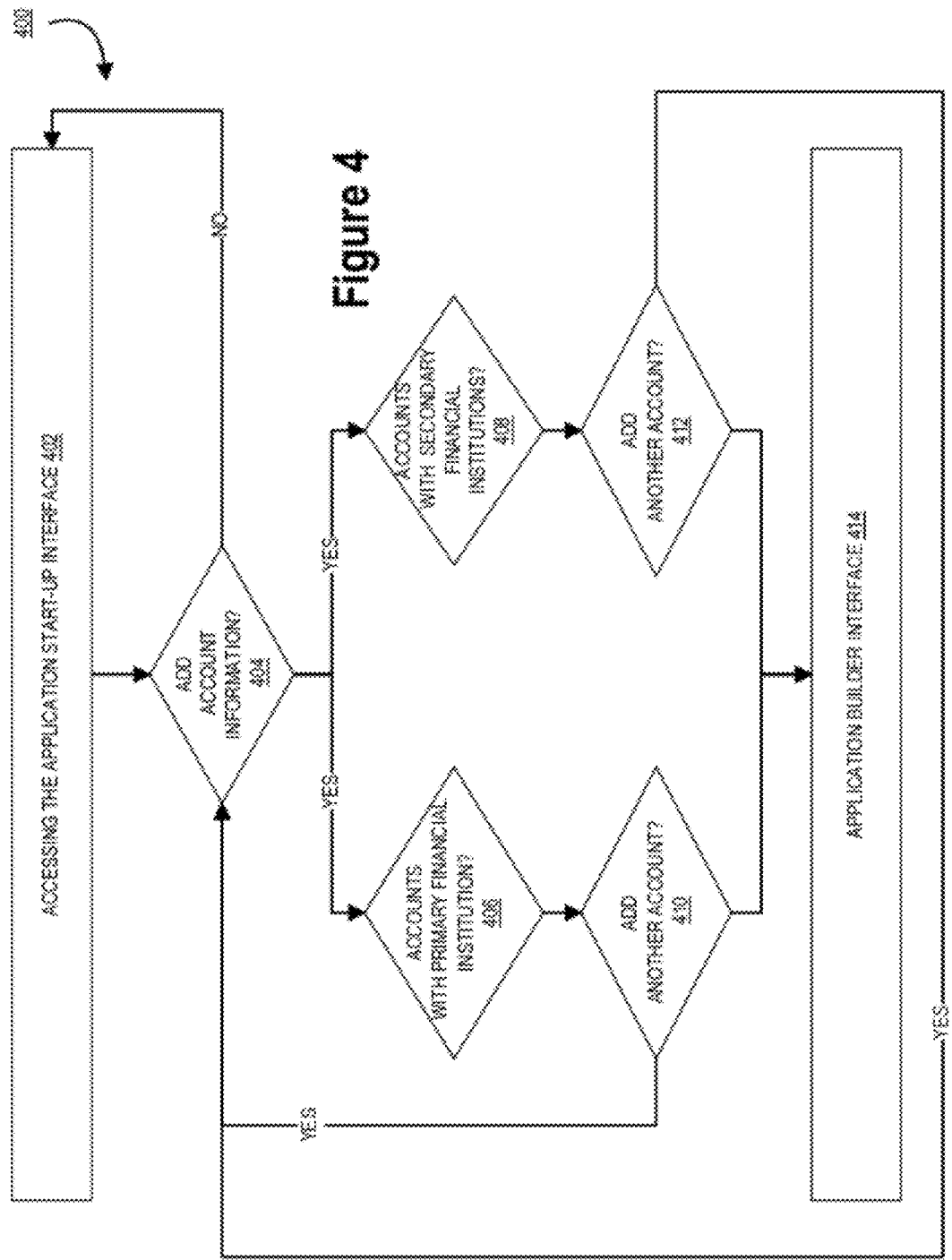
Figure 5:
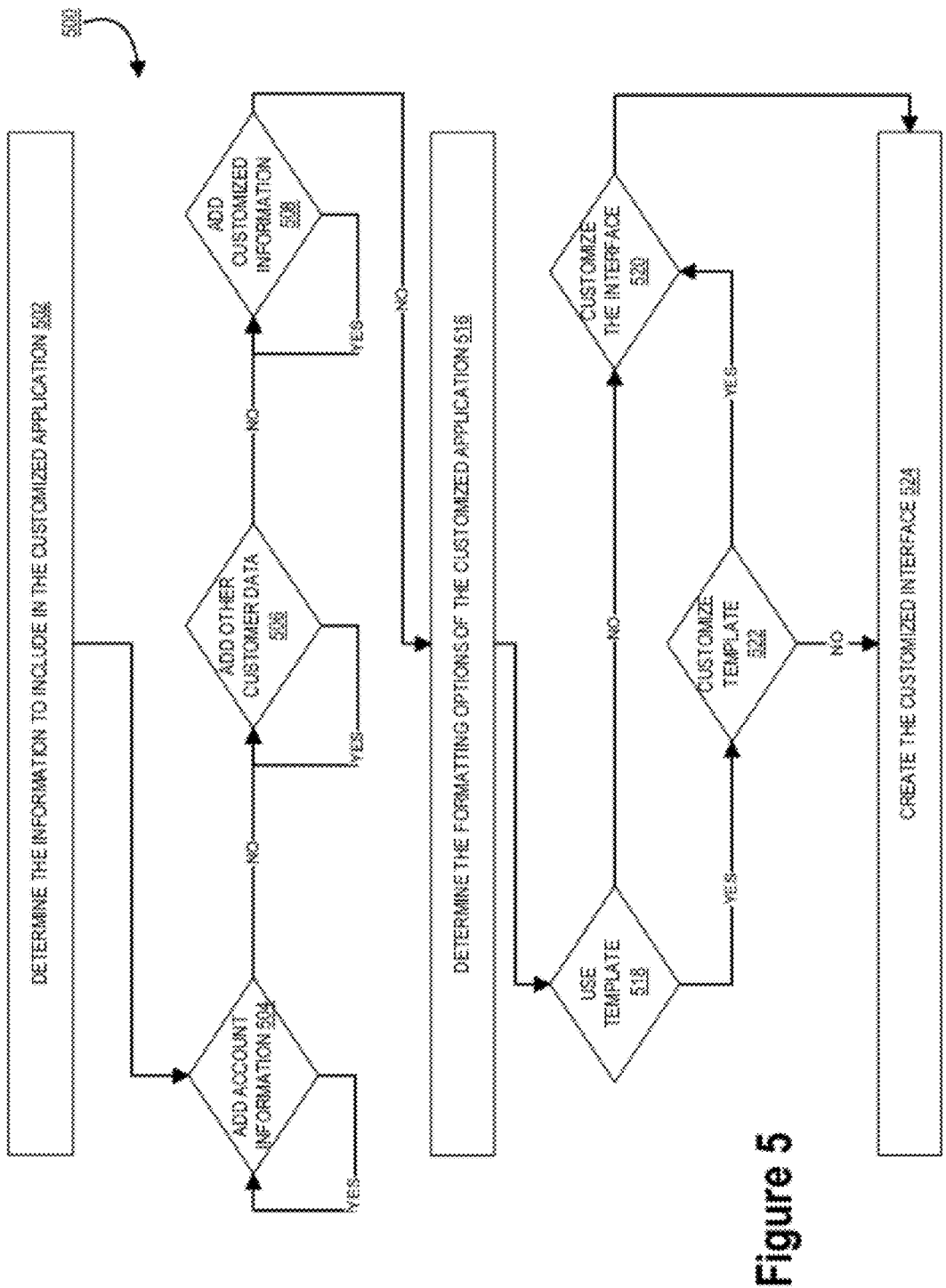
Figure 7:
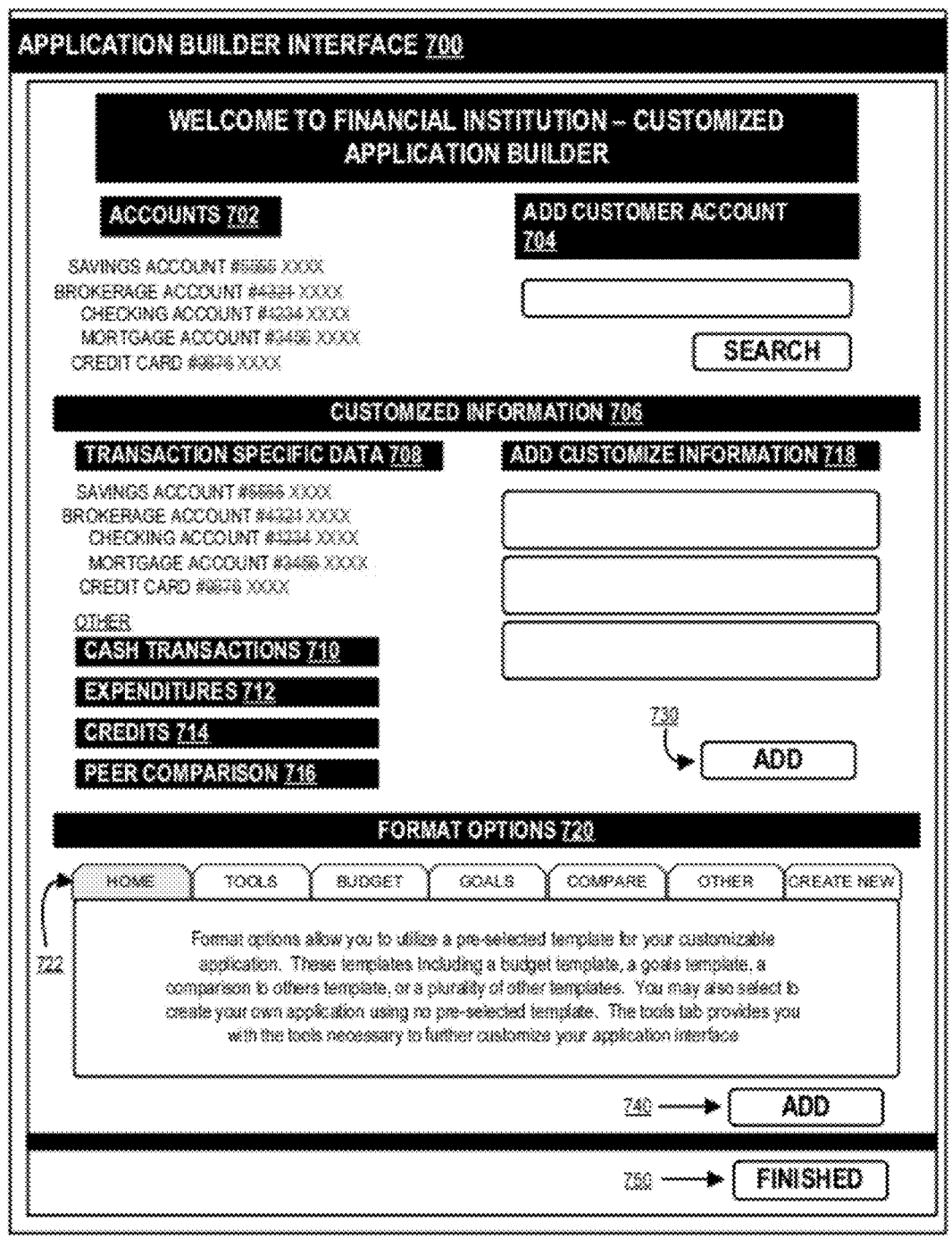
Figure 9:
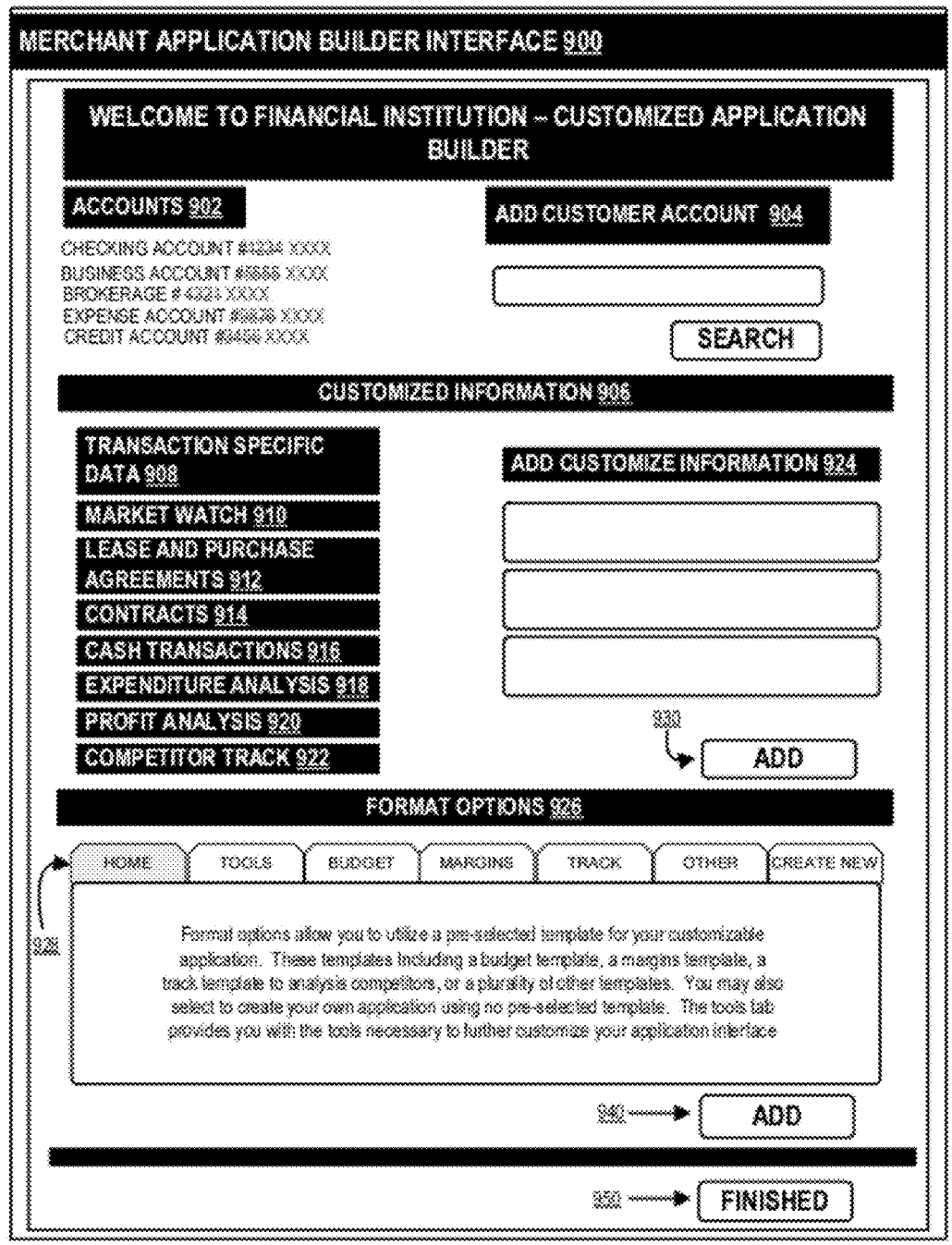
Figure 10:
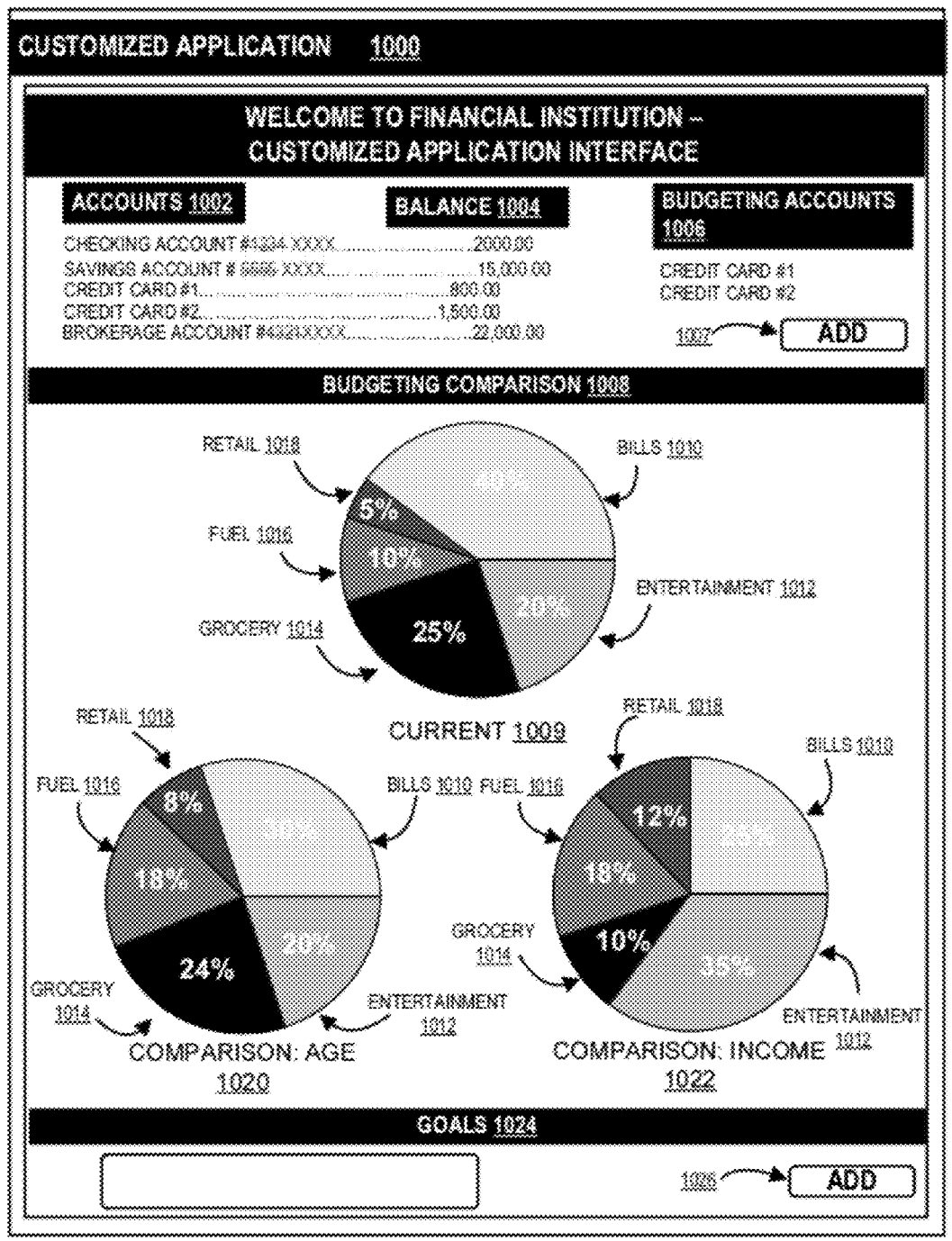

Having thus described embodiments of the invention in general terms, reference will now be made the accompanying drawings, which are not necessarily drawn to scale, wherein:

FIG. 1 provides a high level process flow illustrating a customized application process for creating a customized application, in accordance with one embodiment of the present invention;

FIG. 2 provides a customizable financial application system and environment for providing a customizable financial institution to a customer, in accordance with one embodiment of the present invention;

FIG. 3 provides a customer data process flow illustrating how customer data is used in the customized application process, in accordance with one embodiment of the present invention;

FIG. 4 provides a customized application set-up process flow illustrating the process of setting up the customized application, in accordance with one embodiment of the present invention;

FIG. 5 provides a customized application builder process flow illustrating the process of creating the customized application, in accordance with one embodiment of the present invention;

FIG. 6 provides a set-up interface for individual users creating a customized application, in accordance with one embodiment of the present invention;

FIG. 7 provides an application builder interface for individual users creating a customizable application, in accordance with one embodiment of the present invention;

FIG. 8 provides a set-up interface for merchant users creating a customized application, in accordance with one embodiment of the present invention;

FIG. 9 provides an application builder interface for merchant users creating a customized application, in accordance with one embodiment of the present invention; and FIG. 10 provides an exemplary customized financial application, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution.

FIG. 1 illustrates a high level process flow for a customized application process 100, which will be discussed in further detail throughout this specification with respect to FIGS. 2 through 9. As illustrated in block 102, the customized application process 100 includes receiving, at the financial institution, a request from the customer to access customer data maintained by the financial institution about the customer. The financial institution systems may also receive a request from the customer to access other data, as illustrated in block 104, such as general data maintained by the financial institution about groups of customers, an average customer, etc. As illustrated in block 106, the financial institution may receive a request from the customer to develop a customized application that displays or otherwise uses the requested data in the way requested by the customer. Thereafter, the financial institution systems develop the customized application, as illustrated in block 108. After the customized application is developed, a customer may view the customized application to analyze, track, and/or edit information related to the customer's accounts, as illustrated in block 110.

For example, in one embodiment of the invention, the financial institution provides an application that the user downloads to the user's mobile device. The application is configured to interact with a server of the financial institution via the mobile communication network. The application is configured to provide the user with numerous options to allow the user to create his own financial tools that utilize the financial institution's stored data about the customer, other customers in general, and/or other more general financial data. For instance, the customizable application may allow the user to create his own charts, tables, or graphs that display user-selected and substantially real time or updated financial metrics that are tracked by the financial institution. In one example, the user may create a chart showing the user's spending on gas relative to an average customer of the financial institution in the same age range and geographic area as the user. In some embodiments, users that use the customizable application to create their own unique financial applications can share these applications with others in a forum. Other users can then use, rate, and/or purchase applications from the forum.

FIG. 2 provides a customizable application system and environment 200, in accordance with one embodiment of the present invention. As illustrated in FIG. 2, the application server 206 is operatively coupled, via a network 201 to the financial institution account systems 208, other financial institution systems 210, and the customer systems 204. In this way, the application server 206 can send and receive information to and from the financial institution account system 208, the other financial institution systems 210, and the customer system 204, to facilitate building a customized application. FIG. 2 illustrates only one example of an embodiment of a customized application system and environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination of wireline and wireless communication between devices on the network.

In some embodiments the customer 202 is an individual that has financial accounts with a financial institution and desires to review and/or compare financial information via a customizable financial institution application. The accounts used for the customized application are any accounts available to the individual customer 202, such as but not limited to savings accounts, checking accounts, credit card accounts, investment accounts, retirement accounts, mortgage accounts, etc. These accounts include accounts with the customer's primary financial institution, as well as accounts that the customer has with other secondary financial institutions. In some embodiments of the invention the customer 202 is a merchant that has financial accounts with a financial institution and desires to review and/or compare finances via a customizable financial institution application. The accounts used for the customized application are any accounts that are available to the merchant customer 202, such as customer accounts, lease agreements, business accounts, brokerage accounts, expense accounts, etc. These accounts include accounts with the customer's 202 primary financial institution, as well as accounts with other financial institutions.

As illustrated in FIG. 2, the application server 206 generally comprises of a communication device 224, a processing device 226, and a memory device 228. As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 226 is operatively coupled to the communication device 224 and the memory device 228. The processing device 226 uses the communication device 224 to communicate with the network 201 and other devices on the network 201, such as, but not limited to the financial institution account system 208, the customer system 204, and other financial institution systems 210. As such, the communication device 224 generally comprises a modem, server, or other device for communicating with other devices on the network 201.

As illustrated in FIG. 2, the application server 206 comprises computer-readable instructions 232 stored in the memory device 228, which in one embodiment includes computer-readable instructions 232 for a financial institution interface application 234. In some embodiments, the memory device 228 includes data storage 230 for storing data related to the customized application including, but not limited to the data created and/or used by the financial institution interface application 234.

In the embodiment illustrated in FIG. 2 and described throughout much of this specification, the financial institution interface application 234 allows the customer 202 to determine, via a customer system 204, data to be used and displayed in the customized application. In one example, the financial institution interface application 234 allows the customer 202 to communicate, via the customer system 204, to indicate the customer account data, customer financial data, customer customized data, and other customer data that the customer 202 wishes to be displayed on the customized application. The data stored within the financial institution interface application 234 provides computer readable instructions 232 to the processing device 226 to allow for development of the customized application. The financial institution interface application 234 stores or accesses information for display in the customized application including, but not limited to, customer accounts, customer financial data, other customer financial data, customer goals, etc. As used herein, customer account information, customer financial data, other customer financial data, and customer goals may be established by the customer 202 via the customer system 204 or established automatically by the financial institution interface application 234.

In one embodiment, as explained in further detail below, the customer account information available for use in the customized application may be derived from all accounts available to the customer 202. In some embodiments of the invention, the account information may be derived from a primary financial institution, secondary financial institutions, or other business that the customer 202 may use to create an account (i.e. credit card held by retailers). For example, the customer 202 may have several accounts at the customer's primary financial institution and secondary financial institutions that can be accessed automatically by the financial institution interface application 234, including savings accounts, retirement accounts, checking accounts, investment accounts, credit card accounts etc. In other embodiments, as explained in further detail below, customer financial data available to use in the customized application may include data provided by the customer 202. For example, customer financial data entered by the customer 202 may comprise of financial information, such as credit cards, mortgages, loans, cash transactions, and other financial information that cannot be accessed by the financial institution interface application 234, such as accounts that are not associated with an online account or accounts associated with institutions that do not allow other financial institutions to access. Furthermore, in other embodiments of the invention the customer 202 may include accounts within the customized application including accounts associated with spouses, dependents, friends, employees, etc.

In one embodiment, as explained in further detail below, other customer data is available for use within the customized application through the financial institution interface application 234. In one embodiment the other customer data may include data from a representative group of customers of the primary financial institution with a specific income, as selected by the customer 202. In one embodiment the other customer financial data may be from a representative group of customers of the primary financial institution with a specific age group, as selected by the customer 202. For example, the customer 202 may wish to compare his retirement account information to other customers of the primary financial institution with a similar savings, age, and/or income level as the customer 202. In other embodiments of the invention the other customer data can come from secondary financial institutions or other businesses that capture financial information of people. In other embodiments of the invention the other customer data may come from social networks or the like, that may be received by the application server 206 through the use of a network 201.

In one embodiment, as explained in further detail below, customer goals available for use within the customized application may include financial goals and strategies determined by the customer 202. Customer goals may include spending goals, savings goals, payment plans, and/or the like. For example, the customer 202 may wish to limit his spending from a checking account for a specific time period. For that time period, the customer 202 may input the goal limit into the customized application, therefore allowing the customized application to display the goal limit and how close he is to the limit for that specific account. In other embodiments of the invention, the customer 202 may input retirement goals into the customized application, thereby allowing the customized application to display the customer's goals as they compare to the goals of other customers within the financial institution.

As illustrated in FIG. 2, the financial institution account system 208 is generally comprised of a communication device 236, a processing device 238, and a memory device 240. The processing device 238 is operatively coupled to the communication device 236 and the memory device 240. The processing device 238 uses the communication device 236 to communicate with the network 201 and other devices on the network 201, such as, but not limited to the application server 206, the customer system 204, and other financial institution systems 210. As such, the communication device 236 generally comprises a modem, server, or other device for communicating with other devices on the network 201.

As illustrated in FIG. 2, the financial institution account system 208 comprises computer-readable instructions 244 stored in the memory device 240, which in one embodiment includes computer-readable instructions 244 for a customer account application 246. In some embodiments, the memory device 240 includes data storage 242 for storing data related to the building of the application including, but not limited to the account data the financial institution has for the customer 202 prior to the customer 202 request, the financial data the financial institution has for the customer 202 prior to the customer 202 request, and the data created and/or used by the customer account application 246.

In the embodiment illustrated in FIG. 2, the customer account application 246 comprises account and financial data received from a financial institution and/or other financial institution systems 210. In one embodiment the account and financial data received by the customer account application 246 comprises data that the customer 202 currently has with the financial institution. For example, if the customer 202 has a savings account and a checking account with the financial institution, the information related to these accounts may be stored in the customer account application 246. The account information can be accessed upon receipt of a request from the customer 202 or from the financial institution interface application 234. Therefore, the customer 202 may use the account information he already has with the financial institution for the customized application, without having to manually input the account information into the interface. In one embodiment the account and financial data received by the customer account application 246 comprises data that the customer 202 has on other financial institution systems 210. For example, if the customer 202 has accounts with a secondary financial institution, once the request for customer account information is made, the customer account application 246 may receive the account information from other financial institution systems 210, and thereafter transfer that information to the financial institution interface application 234. In other embodiments of the invention the financial institution interface application 234 can access the other financial institution systems 210 directly in order to access account information for customer accounts at the secondary financial institutions for use in the customized application.

The customer account application 246 also allows for storage in the memory device 240 of other customer financial data upon request of the customer 202. The other customer financial data comprises the same or similar data as stored for the customer 202. Since the financial institution stores financial data about many customers, the financial institution can utilize this information by providing non-identifying customer data to the customer 202 for use in the customized application. In this way the customer account application 246 may communicate, via the network 201 with the application server 206 to provide the financial institution interface application 234 other customer data, so that the customer 202 may be able to utilize the other customer data as a comparison with the customer's own data.

As illustrated in FIG. 2 the customer system 204 is generally comprised of a communication device 212, a processing device 214, and a memory device 216. The customer system 204 is a computing system that allows a user to provide information for a customized application, via a network 201, to the financial institution interface application 234. Further, the customer system 204 allows the customer 202 to view the customized application. The processing device 214 is operatively coupled to the communication device 212 and the memory device 216. The processing device 214 uses the communication device 212 to communicate with the network 201 and other devices on the network 201, such as, but not limited to the application server 206, the financial institution account system 208, and other financial institution systems 210. As such, the communication device 212 generally comprises a modem, server, or other device for communicating with other devices on the network 201.

As further illustrated in FIG. 2, the customer system 204 comprises computer-readable instructions 220 stored in the memory device 216, which in one embodiment includes computer-readable instructions 220 for a customer interface application 222. In this way, a customer 202 may be able to access the customized application, such as the application set-up interface and application builder interface, in order to create the customized application using customer account information, customer data, other customer data, customer goals, etc. and provide the format for the customized application, using the customer interface application 222. The customer system 204 may be, for example, a desktop personal computer, a mobile system such as a laptop, personal digital assistant ("PDA"), cellular phone, smart phone, or the like. Although only a single customer system 204 is depicted in FIG. 2, the customizable application system and environment 200 may contain numerous customer systems 204.

The other financial institution systems 210 are operatively coupled to the financial institution account system 208, the application server 206, and/or the customer system 204 through the network 201. The other financial institution systems 210 have systems with devices the same or similar to the devices described for the customer system 204, the financial institution account system 208, and the application server 206 (i.e., a communication device, a processing device, and a memory device). Therefore, the other financial institution systems 210 communicates with the financial institution account system 208, the application server 206, and/or the customer system 204 in the same or similar way as previously described with respect to each system. The other financial institution systems 210, in some embodiments, are comprised of systems and devices that allow the customer 202, the financial institution account system 208, and the application server 206 to access account and financial information regarding the customer 202 stored at other financial institutions.

It is understood that the servers, systems and devices described herein illustrate one embodiment of the invention. It is further understood that one or more of the servers, systems, and devices can be combined in other embodiments and still function in the same or similar way as the embodiments described herein.

FIG. 3 illustrates a customer data process flow 300 illustrating the inputs that are used to create the customized application. As illustrated in block 302 a customer may request to set up a customized application on the customer system 204. In some embodiments of the invention the customer 202 can download a customized application to the customer system 204 in order to create customized applications on the customer system 204. In other embodiments of the invention the customer 202 can create a customized applications within the customer's 202 online banking application provided by the financial institution through the used of the customer system 204.

Once the request is received that the customer 202 wants to create a customized application, the financial institution interface application 234 determines the customer accounts that are available for inclusion in a customized application. In one embodiment of the invention, the customer account information 310 may include all the customer accounts available to the customer through the primary financial institution and secondary financial institutions. For example, the customer 202 may have several accounts, including savings accounts, retirement accounts, checking accounts, investment accounts, or credit card accounts with various financial institutions. These accounts may be included as the customer account information 310 displayed to the customer 202 for ultimate inclusion into the customized account interface. In one embodiment, the customer account information 310 added may be financial accounts from the primary financial institution such as savings accounts, checking accounts, retirement accounts, brokerage accounts, etc. In other embodiments the customer account information 310 added may be accounts from a secondary financial institution, including accounts such as savings accounts, checking accounts, retirement accounts, brokerage accounts, etc.

As illustrated in block 304 of FIG. 3, after the customer 202 chooses to create a customized account application, one of the application set-up interfaces 600, 800 is displayed to the customer 202, depending on the on the type of customer 202. As illustrated by block 304, prior to using the builder interfaces 700, 900 the customer 202 may supply several inputs that the customer 202 may want to include in the customized account interface. The customer 202 may provide financial data in the form of customer financial data 312. The customer financial data 312 may comprise of financial information, such as credit cards, mortgages, loans, and other financial information the financial institution and other financial institutions may have regarding the customer 202. Furthermore, in some embodiments other accounts maybe included within the customer financial data 312 including accounts associated with spouses or dependents, and/or cash transactions made by the customer 202 or other people associated with the customer's accounts. The customer 202 may also provide customized data in the form of customer goal data 316. Customer goal data 316 includes data such as spending goals, savings goals, payment plans, etc. For example, the customer 202 may wish to limit his spending from a specific account for a specific time period. The customer 202 may input the goal limit and the interface may display to the customer 202 his goal limit and how close he is to the goal spending limit for that specific account. In some embodiments the customer 202 may provide shopping list information to include on the customized application.

Furthermore, the customer 202 may request other customer financial data 314 to be included in the customizable application. The other customer financial data 314 requested may come in many forms. For example, the customer 202 may request to see peer financial data, such as but not limited to, retirement savings a similarly financially situated individual has accumulated compared to the customer 202. The customer 202 may request to see peer financial data as it relates to mortgages or home ownership. The customer 202 may request to see peer financial data as it relates to investment account or savings account information. The customer 202 may request to see peer financial data as it relates to checking or debit account information. In one embodiment the customer 202 may request to see other customer financial data 314 from a representative group of people with a similar income. In one embodiment the customer 202 may request to see other customer financial data 314 from a representative group of people with higher incomes. In one embodiment the customer 202 may request to see other customer financial data 314 from a representative group of people with lower incomes. In one embodiment the customer 202 may request to see other customer financial data 314 from a representative group of similarly aged individuals. In one embodiment the customer 202 may request to see other customer financial data 314 from a representative group of individuals of a different age group.

As illustrated in FIG. 3, once the customer 202 selects the customer financial data 312, the customer goal data 316, and/or the other customer financial data 314 to include in the customized application, the financial institution interface application 234 receives data from the financial institution account systems 208, the other financial institution systems 210, and/or other systems in the primary or secondary financial institutions or businesses. Thereafter, the financial institution interface application 234 displays the application builder interfaces 700, 900 to the customer 202 to allow the customer 202 to determine how the customer 202 would like the information displayed in the customized application, as illustrated by block 306.

In the application builder interfaces 700, 900 the customer 202 utilizes the account information selected in order to create the customize application. Within the application builder interfaces 700, 900 the customer 202 may request to use a template interface, create his own customized interface, or utilize parts of both. As illustrated by block 318, the template interfaces 318 may be provided by the financial institution, and may organize customer data in ways that the financial institution may think is helpful to its customers 202. In other embodiments of the invention, customers 202 may create their own customized interfaces and save them as templates for other customers 202 use within the financial institution interface application. Still in other embodiments of the invention the customers 202 may select templates to use in the customized application, but thereafter make changes to the template to tailor the customized application to the individual customer's needs.

In some embodiments of the invention, the templates include templates designed specifically for interfaces directed to budgeting, goals, account management, financial comparisons, etc. For example, the budgeting template may provide the customer 202 with a template interface displaying accounts and budgeting goals based on the customer 202 inputs. The customer 202 may wish to limit spending in three accounts. The three accounts will be displayed on the customized application along with the goal limits. The customized application may also provide break-downs of where the spending in the three accounts came from. For example, a pie chart indicating the percent spent on various items, so that the customer 202 may see spending habits. The template may also display the average budgets of similarly situated customers through the use of the other customer data provided by the financial institution. The comparisons with other customers may allow the customer 202 to see areas of his budget where he can reduce expenditures and save additional amounts of money.

In other examples of templates, the goals template may provide the customer 202 with a template interface displaying accounts and account goals based on the customer's inputs. For example, the customer 202 may wish to save a specific amount each year in a savings account and an investment account. The template may illustrate the various types of accounts available to the customer 202, and the amount of money the customer 202 needs to fund the account in order to reach the customer's short term and long terms savings goals. In some embodiments, the template may include the savings account and the investment account, as well as the savings thus far and the amounts left to save for the year, in order to reach the goals established by the customer 202. In some embodiments the template may also illustrate the average, high, and low savings goal of other similarly positioned customers. The comparisons with the other customers may allow the customer 202 to see area of his savings goals that can be improved.

In other examples, the template may comprise a financial comparison template that provides the customer 202 with an interface that displays customer account comparisons between the customer 202 and other customers. For example, the customer 202 may wish to use the comparison template interface to compare his financial situation to others similarly positioned as him. The customer 202 may choose to see how his financial accounts compare to a representative population of similarly aged individuals with similar incomes. The customer 202 may also choose to compare his current financial situation with similarly positioned individuals older or younger than him.

In other embodiments of the invention, as illustrated by block 320, the customer 202 may provide for a customized format. The customized format allows the customer 202 to format the customized application in any display that he wishes. For example, if the customer 202 wants to display budgeting information on his interface, he may choose a custom format 320 in order to place both budgeting information and also comparison information on his customized application 308. In utilizing the custom format the customer 202 may be able to customize the data displayed on the customized application 308 in any order or position that the customer 202 feels is most applicable to the customer's 202 own needs.

FIG. 4 illustrates a customized application set-up process 400 for inputting accounts for the customizable application. The customized application set-up process 400 is initiated when the customer 202 requests access to data from the financial institution in order to create a customized application. As illustrated in block 402, the customer 202 accesses the application start-up interface 600 illustrated in FIG. 6, or a similar interface. As illustrated by decision block 404, within the application start-up interface 600 the customer 202 may add account information. The account information may be from the primary financial institution, as illustrated by decision block 406, or from a secondary financial institution, as illustrated by decision block 408. As illustrated by decision block 406, if the account information is with the financial institution, the financial institution interface application 234 may access the account information from the financial institution system 208. Thereafter, the customer 202 may select the accounts he or she wishes to include in the customized application. If the customer 202 wishes to add another account as illustrated in decision block 410, the customer 202 is returned to decision block 404 to add additional account information.

As illustrated by decision block 408, if the account information that the customer 202 wishes to add is with a secondary financial institution, the financial institution interface application 234 may access the account information from other financial institution systems 210 or from the account information stored by a customer account application 246 in the financial institution account systems 208, related to the accounts of the customer 202 at other financial institutions. In some embodiments of the invention the customer 202, may have to provide information regarding the account prior to the account being selected for the customized application, as explained later with respect to FIG. 6.

If the customer 202 wishes to add another account, as illustrated by decision block 412, the process returns to decision block 404. Once the customer 202 has completed adding all of his accounts that the customer 202 wants to include in the customized application, the customer is taken to the application builder interface 700, as illustrated by block 414.

The application set-up interfaces 600, 800 are illustrated in FIGS. 6 and 8. FIG. 6 illustrates one embodiment of an individual customer application set-up interface 600. Prior to adding any account information the customer 202 may create a username 604 and password 608 for the customized application in the create username/password section 602. The username 604, password 608, and re-enter password 610 entries may be used for security purposes, while the email address 606 provides the financial institution with contact information. Utilizing this information the financial institution may provide the customer 202 with his associated account information 612 that can be added to the customized application.

As previously discussed, the account information 612 may be information regarding accounts held at the primary financial institution, or the account information 612 may enable the customer 202 to add accounts to the customizable application. The accounts may be with a primary financial institution, as illustrated in section 614 or the accounts may be with other financial institutions, as illustrated in section 616. The accounts with us section 614 in the set-up interface 600 displays the accounts that the customer 202 has with his primary financial institutions. In the example provided in FIG. 6, the customer 202 has a checking account, a savings account, a brokerage account, a credit card, and a mortgage account with the financial institution.

In one embodiment of the invention, the customer 202 may select the accounts for the customized application by selecting the box located next to the desired account in the accounts with us section 614. For example, if the customer 202 wishes to have his savings account be displayed on the customized interface, he would select the check box located next to savings account on the application set-up interface 600. The accounts with us section 614 also allows for the customer 202 to apply for and add other accounts that the customer 202 did not previously have with the financial institution by selecting the "other account—not listed" link.

In one embodiment of the invention, in the accounts with other firms section 616, the customer 202 may select the accounts the customer 202 has with other financial institutions. The accounts with other firms section 616 allows the customer 202 to select or add checking accounts, savings accounts, brokerage accounts, credit accounts, mortgage accounts, and custom selections from other financial institutions. Once an account is selected, the customer 202 may be prompted to input the account name 618 and the account number 620, as well as the other financial information, such as the name of the secondary financial institution, to allow the primary financial institution to access the account information. For example, if the customer 202 wishes to have a checking account from a secondary financial institution be displayed on the customized application, the customer 202 may provide the account name and account number in the account name section 618 and the account number section 620, and thereafter the financial institution interface application 234 or the customer account application 246 may obtain the necessary account information from the secondary financial institution.

After each of the accounts are added the customer 202 may select the add button 630 on the application set-up interface 600 to add that account to the customized application. Once the customer 202 has added all of the accounts he wishes to have displayed on the customized application, the customer 202 may select the continue button 640.

FIG. 8 illustrates a merchant customer application set-up interface 800. Prior to adding account information the merchant customer 202 may have to enter the merchant name 804 and create a password 806 in the create user name/password section 802 of the merchant customer application set-up interface 800. The merchant customer 202 may have to enter a merchant name 804, a password 806, and re-enter the password 808 for security purposes. Utilizing the merchant name 804 and password 806 the financial institution may provide the merchant customer 202 with account information 810. As previously discussed, the account information 810 may be information regarding accounts that the merchant customer 202 has with the primary financial institution or the account information 810 may enable the merchant customer 202 to add accounts that the merchant customer 202 has with other financial institutions. The account with us section 812 in the merchant set-up interface 800 displays the accounts the merchant customer 202 has with the primary financial institution. In the example illustrated in FIG. 8 the merchant customer 202 has a checking account, a business account, a brokerage account, an expense account, and a credit account with the primary financial institution. The merchant customer 202 may add any of the accounts listed to the customized application by selecting the box located next to the account. For example, if the merchant customer 202 wanted to have its business account be displayed in the customized application, the merchant would select the check box located next to business account in the accounts with us section 812 the merchant application set-up interface 800. The accounts with us section 812 also allows the merchant customer 202 to add accounts that the merchant customer 202 does not currently have at the primary financial institution by selecting the "other account—not listed" link.

In the accounts with other firms section 814 the merchant customer 202 may select the accounts that the merchant has with secondary financial institutions. The accounts with other firms section 614 allows the merchant customer 202 to select checking accounts, business accounts, brokerage accounts, expense accounts, credit accounts, and custom selections from other financial institutions. Once an account is selected the merchant customer 202 may be prompted to input the account name 816 and the account number 818 of the account at the secondary financial institution. For example, if the merchant customer 202 wishes to have an expense account from a secondary financial institution be displayed on the customized application, the merchant customer 202 may provide the account name in the account name section 816 and the account number in account number section 818. The financial institution interface application 234 obtains the account information from the other financial institution systems 210 or from the financial institution account systems 208 if the account information has already been captured by the customer account application 246.

After each account is added the merchant customer 202 may select the add button 830 in the merchant application set-up interface 800 to add the accounts to the customized application. Once the merchant customer 202 has added all of the accounts he wishes to have displayed on the customized application, the merchant customer 202 may select the continue button 840.

FIG. 5 illustrates a customized application builder process 500 for creating a customizable application after receiving the customer's request to access customer account data. In one embodiment, the customized application creation process 500 is initiated by the customer 202 completing the customized application set-up process 400 in the application set-up interfaces 600, 800 and accessing the application builder interface 700, 900. The customized application builder process 500 begins by accessing the application builder interface 700, 900, as described in more detail below.

As illustrated by decision block 504 through 508, the application builder interface 700, 900 allows the customer 202 to add account information 504, other customer data 506, or customized information 508 to the customized application. The account information, as illustrated in block 504, may comprise of accounts from the primary financial institution and any secondary financial institutions that that the customer 202 selected in the customized application set-up process 400. In some embodiments of the invention, the application builder interface 700, 900 may allow the customer 202 to add additional accounts that the customer 202 may have not added in the customized application set-up process 400. In other embodiments of the invention, the application builder interface 700, 900 can take the place of the application set-up interface 600, 800 to allow the customer 202 to select the accounts from the primary and secondary financial institutions that the customer 202 wants to include in the customized application.

The other customer data, as illustrated in decision block 506, may include a request from the customer 202 to add other customer's financial data from the financial institution into the customized application. The other customer data may include various different types of data. For example, in one embodiment the customer 202 may request to compare the customer's account information with other customer data related to a representative group of people with similar incomes, higher incomes, and/or lower incomes. In another embodiment the customer 202 may request to compare his account information with other customer data from a representative group of individuals of similar or different ages. In one embodiment the customer 202 may request to compare all of his accounts with the other customer data or only a select number of accounts. In some embodiments of the invention the other customer data, as illustrated in block 506, may be based on a nationwide average of customers, a regional average of customers, a state average of customers, a county average of customers, a city average of customers, and/or a localized average of customers, etc.

For example, the customer 202 may request to compare other customer data of a representative group of individuals with approximately the same income, approximately the same age group, and who live in the same state. The customer 202 may wish to compare all of his accounts to this type of other customer data in order to determine where he is financially as compared to his peers. In another example, the customer 202 may not wish to compare all of his accounts to other customers; he may only wish to select specific accounts to compare, such as a savings account and/or an investment account.

The customized information, as illustrated in decision block 508, may include data such as spending goals, savings goals, payment plans, etc. The customized information provides the customer 202 with the ability to customize the application, thus, the customer 202 has the ability to determine how the information that the customer 202 selected is illustrated on a display screen. For example, the customer 202 may wish to save money in a savings account for a specific amount of time. The customer 202 may input the amount he wishes to save, the span of time in which he wants the amount saved, and the account to which he is directing the savings. For the desired time, the customer 202 may view his progress towards the goal via the customized application because all the information he inputted will be displayed on the interface in a format that he selects.

As illustrated by block 516, after the information is identified for inclusion into the customized application, the customer 202 may determine how the customized application should be displayed. In one embodiment, the customer 202 may select a pre-established template to create his or her customized application, as illustrated in decision block 518. In one embodiment of the invention the templates are created by the financial institution and can be used to compare specific types of information. For example, one template may compare the customer's savings accounts and investments accounts with similar aged customers living in the same city, through the use of pie charts, graphs, average return rates for different types of accounts, etc. In other embodiments of the invention one template may be comprise of cash flows in and out of the customer's accounts compared to cash flows of average customers living in various areas of the country with a similar cost of living. The templates may be any type of template set up by the financial institution, other customers, other types of businesses that are allowed access to the customized application, etc. For example, in some embodiments other businesses may want to push a particular investment vehicle, retirement plan, savings plan, home mortgage, car payment, etc. Therefore, in some embodiments of the invention, the business may be allowed to set up templates that the customer 202 can use to see where the customer's finances stand with respect to the particular investment vehicle, retirement plan, savings plan, home mortgage, car payment, etc.

If the user does not wish to utilize a template then, as illustrated by decision block 520, the customer 202 may customize his own application. For example, as explained in further detail later, the customer 202 may apply financial tools, such as pie charts, cash flow analysis, investment trending charts, etc. to the customized application. Alternatively, as illustrated by block 522, if the customer 202 decides to use a template, the customer 202 may also customize the template for the customer's own use. Once the format of the customized application is selected the customer 202 can complete the customized application builder process 500, by creating the customized application, as illustrated by block 524.

Embodiments, of the application builder interfaces 700, 900 that may be used in the customized application builder process 500 are illustrated in FIG. 7 and FIG. 9. FIG. 7 provides an individual customer application builder interface 700. The application builder interface 700 provides an accounts section 702 that lists the customer accounts from the application set-up interface 600 in FIG. 6, which the customer 202 selected for the customized application. As illustrated in the add customer account section 704, the customer 202 may add an account that the customer 202 forgot to add in the application set-up interface 600. Again, the customer accounts may include accounts, such as savings, checking, credit cards, mortgages, loans, and other financial accounts at the primary financial institution or secondary financial institution. Once the customer 202 inputs the selected customer account information in the add customer account section 704, the account may appear under the accounts section 702. For example, FIG. 7 may include accounts from the set-up interface 600, such as a savings account, a brokerage account, and a checking account, as well as account information added from the add customer account section 704, such as a mortgage account and a credit card account.

As illustrated in the customized information section 706, the customized information may include a transaction specific data section 708, cash transaction data section 710, expenditures section 712, credits section 714, and peer comparison section 716. The transaction specific data section 708 may include adding goals or achievements to specific accounts in the customized application. As explained above the goals or achievements may include data such as spending goals, savings goals, payment plans, etc. For example, the customer 202 may wish to save money in a savings account for a specific amount of time. Therefore, the customer 202 may input the amount he wishes to save, the time frame in which he wishes to save it, and the account to which he is directing the savings. For the selected time frame, the customer 202 may view his progress toward the goal via the customized application because all of the information he inputted is displayed in the customized application in a format that he selects.

Cash transaction section 710, in some embodiments, allows the customer 202 to input and monitor cash transactions in which the customer 202 entered on the customized application. Expenditures section 712, in some embodiments allows customers 202 to monitor expenses made with the customer accounts, in order to examine when and where the customer 202 spends money. Credits section 714, in some embodiments, allows the customer 202 to monitor credits made to the customer accounts, in order to examine when and where the customer's money is coming from. The peer comparison section 716 allows the customer 202 access to other customer data, as previously described. Within the peer comparison section 716 the customer 202 may select the other customer data with which the customer 202 wants to compare his accounts to.

If the customer 202 elects to provide customized information in the add customized information section 718 for the customized application, he may input the transaction specific data, cash transaction data, expenditures data, credits, and peer composition into the add customized information section 718. Once the add customized information section 718 is populated the customer 202 may select the add button 730 to incorporate the customized information into the customized application.

As illustrated in the format options section 720 of FIG. 7, the customer 202 may choose the format options 720 for the customized application. In one embodiment, the customer 202 may select a pre-determined template or create his or her own template for the application via a tab section 722. The tabs may include templates designed specifically for applications directed to budgeting, to goals, to account management, and to comparisons. The budgeting template provides the customer 202 with a template interface directed towards accounts and budgeting goals the customer 202 inputs. The goals template provides the customer 202 with a template interface directed towards accounts and account goals inputted by the customer 202. The compare template provides the customer 202 with a template interface directed towards customer account comparisons with other customers. In other embodiments of the invention the compare template can be combined with or work in conjunction with one or more of the other templates.

In one embodiment, format options section 720 allows the customer 202 to create a custom interface. The custom format allows the customer 202 to format the customized application in any manner that he chooses. Utilizing the custom format the customer 202 may be able to customize the data displayed on the application in any order or positioning using a number of financial management tools, graphs, etc.

Once the customer 202 has selected from the format options section 720 the customer 202 may select to add his format option by selecting the add button 740. Once the customer 202 is satisfied with the information selected in the customized information section 706 and the format options section 720 he may select to submit his inputs by selecting the finished button 750.

FIG. 9 provides a merchant customer application builder interface 900. The merchant application builder interface 900 provides an accounts section 902 that list the accounts from the application set-up interface 800 that the customer 202 selected for the customized application. In add customer accounts section 904, the merchant customer 202 may add the additional customer accounts that the customer 202 did not previously add in the application set-up interface 800. As previously explained, the customer accounts may include accounts, such as credit cards, mortgages, loans, and other financial information. Once the accounts are added to the add customer account 904 the accounts may appear under the accounts section 902. For example, FIG. 9 includes accounts from the application set-up interface 800, such as a checking account, a business account, and a brokerage account, as well as additional accounts added using the add customer account section 904, such as a credit account and an expense account.

The merchant customer application builder interface 900 has a customized information section 906, in which the merchant customer 202 can add customized information. The customized information section 906, may include a transaction specific data section 908, market watch section 910, lease and purchase agreements section 912, contracts section 914, cash transactions section 916, expenditure analysis section 918, profit analysis section 920, and competitor tracking section 922. The transaction specific data section 908 may allow the customer 202 to add information in the customized application regarding specific transactions as reminders or goals for the merchant. For example, a merchant customer 202 may pay a low price for supplies which fluctuate in the market. The next time the merchant customer 202 purchases those same supplies the merchant customer 202 knows what the merchant has paid over time for the supplies. The market watch section 910 may allow the merchant customer 202 to watch the market of either competitors or business partners. The lease and purchase agreements section 912 may allow the merchant customer 202 to view the profits and/or expenses from the accounts 902 for all lease and purchase agreements made by the merchant customer 202 through a customized application. The contracts section 914 may allow the merchant customer 202 to view current contracts that the merchant customer 202 has and the profits and/or expenses being paid with respect to the contract on the customized application. The cash transaction data section 916 allows the merchant customer to input and monitor cash transactions through the customized application. The expenditure analysis section 918 may allow the merchant customer 202 to monitor all expenses made with the accounts 902 to examine when and where the merchant customer 202 spends money. Profit analysis 920 allows the merchant customer 202 to monitor all credits made to the accounts 902 to examine when and where the merchant's funds are being utilized. The competitor tracking section 922 may allow the merchant customer 202 access to other merchant customer 202 data to compare the merchant accounts with other similarly positioned merchants. Within the competitor tracking section 922 the merchant customer may be provided a comparison of one or more of its accounts or finances with the accounts and finances of its peers. If the merchant customer 202 elects to provide customized information in the add customized information section 924, the merchant customer 202 may input more specific details of the customized information to include in the customized application. Once the customized information in the customized information section 906 is selected the merchant customer 202 may select the add button 930 to incorporate the customized information into the customized application.

As illustrated in the format options section 926 of FIG. 9, the merchant customer 202 may choose the format in which to display the customized application. The merchant customer 202 may select a pre-determined template or create its customized interface for the customized application via a tab section 928. The tabs include templates designed specifically for applications directed to budgeting, margins, and to track finances. The budgeting template may provide the merchant with a template interface related accounts and budgeting goals that the merchant customer 202 inputted in the customized information section 906. The margins template may provide the merchant customer 202 with a template interface directed to displaying accounts and account goals that the merchant customer 202 inputted in order to track the margins of the merchant. The track template may provide the merchant customer 202 with a template for making comparisons of the merchant accounts with other merchants. In other embodiments of the invention, the track template may be located within other templates or work in conjunction with other templates in order to track merchant data with respect to other merchants.

In other embodiments of the invention, the merchant customer 202 may also utilized the format options section 926 to create a customized interface. The customized format features allow the merchant customer 202 to format the customized application in any manner that the merchant customer 202 desires to see its financial institution displayed. Utilizing the custom format the merchant may be able to customize the data displayed in the customized application in any order or positioning desired.

Once the merchant customer 202 has selected from the format options section 926 the merchant customer 202 may select to add his format option by selecting the add button 940. Once the merchant customer 202 is satisfied with the information selected in the customized information section 906 and the format options section 926 he may select to submit his inputs by selecting the finished button 950.

FIG. 10 illustrates a customized application 1000. Once the customer 202 has selected the format for the customizable application, the financial institution interface application 234 may provide the customer 202 with the interface that he created through a network 201 to a customer system 204. Individual customized applications 1000 may be downloaded onto the customer system 204, such that the customer system 204 may have one or more customized applications 1000 to track and/or compare customer 202 information with respect to like situated peers.

One embodiment of the customized application 1000 that can be created by the customer 202, is illustrated in FIG. 9 and displays a comparison of the some of the accounts of the customer 202 with the accounts of other customers based on similar ages and incomes. The accounts section 1002 lists the accounts the customer 202 provided for the application 1000 at the set-up interface 600 and the builder interface 700. In the balance section 1004, the current balance for each account in the accounts section 1002 is displayed. For example, in this instance, checking account, as displayed in section 1002, has a current balance of xxxx.xx dollars, as displayed in the balance section 1004. The customized application 1000 created by the customer 202, in this embodiment, displays a budget comparison of two of the accounts listed in the accounts section 1002. In some embodiments of the invention, the customer 202 may add additional accounts to the budgeting accounts section 1006 by selecting an account from the accounts listed in the accounts section 1002 and selecting the add button 1007. At the application builder interface 700, the customer 202 has also chosen to perform a peer comparison of like aged and like income individuals. The financial institution interface application 234 compiles the like age and like income data from other customers' and provides the data to the customer system 204, via the customized application 1000. For example, the customer 202 has selected to view budget comparisons of the accounts of credit card #1 and credit card #2 as illustrated in the budgeting accounts section 1006. Therefore the financial institution interface application 234 provides the customer 202 with information about how like situated peers, for age and income, utilize their credit cards, as displayed in the age pie chart 1020 and income comparison pie chart 1022 in the budgeting comparison section 1008.

The budgeting comparison section 1008 may include a current pie chart 1009 of the customer 202 spending based on the accounts selected by the customer 202. The current pie chart 1009 shows the most common purchases made with credit card #1 and credit card #2, these purchases include retail store purchases 1018, fuel purchases 1016, grocery purchases 1014, entertainment purchases 1012, and payment of bills 1010. The common purchases made by the customer 202 are reflected in credit card purchases made my peers of like age and income. The provided break-downs of the customer's current spending in a current pie chart 1009 and the spending of like age individuals in an age pie chart 1020 and like income individuals in an income pie chart 1022 provides the customer 202 with a percentage break down of spending on various items. In this way, the customer 202 may see spending habits and areas in which he could be saving.

The customized application 1000, in this instance further provides a section for goals 1024. After the customer 202 has viewed his current spending in the current pie chart 1009 and the spending for like aged peers in an age pie chart 1020 and like income peers in an income pie chart 1022 the customer 202 may wish to limit his spending in specific areas. For example, after viewing the budget comparison section 1008, the customer may wish to limit his spending on groceries 1014. The goals section 1024 allows the customer 202 to input his goals as they relate to the budgeting comparison 1008. Once the customer 202 has inputted his goals he can add the goals to the customized application 1000 by selecting the add button 1026. Selecting goals in the goal section 1024 allows the financial institution interface application 234 to further track the budgeting comparison 1008 with respect to the customer's spending goals.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A customizable application system comprising:
   a memory device;
   a communication device; and
   a processing device operatively coupled to the memory device and the communication device, wherein the processing device is configured to execute computer-readable program code to:
   receive a request from a financial institution customer to access financial institution customer data associated with financial accounts the customer has;
   determine account information associated with accounts within a primary financial institution;
   request financial institution customer data for accounts from one or more different financial institutions that the financial institution customer has identified as having an account associated therewith;
   receive, automatically, based at least in part on the request for financial institution customer data from the one or more different financial institutions, account information for the accounts associated with the one or more different financial institutions;
   compile the account information associated with the accounts within the primary financial institution and the account information received from one or more different financial institutions to create financial institution customer data for the customer;
   compare, using the financial institution customer data, a financial situation of the financial institution customer during a first time period with a financial situation of the financial institution customer during a second time period, wherein the first time period and the second time period are selected by the financial institution customer;
   compare the financial situation of the financial institution customer during the first time period with a financial situation of a group of other financial institution customers, wherein financial situation comparison includes a comparison between financial savings, a budget, and a cash flow of the financial institution customer and the group of other financial institution customers, wherein the first time period is selected by the financial institution customer;
   initiate a presentation of a user interface to enable the financial institution customer to develop a customized application based at least in part on the financial institution customer data determined from account information from both the primary financial institution and one or more different financial institutions; and
   display the customized application to the customer.

2. The customizable application system of claim 1, wherein the processing device is further configured to execute computer-readable program code to receive a request from the financial institution customer to add customized information; and wherein the customized application is developed based at least in part on the customized information.

3. The customizable application system of claim 2, wherein the customized information is a goal that the financial institution customer wants to track using the customized application.

4. The customizable application system of claim 1, wherein the processing device is further configured to execute computer-readable program code to receive a request from the financial institution customer to utilize a template; and wherein the customized application is developed based at least in part on the template.

5. The customizable application system of claim 1, wherein the processing device is further configured to execute computer-readable program code to receive a request from the financial institution customer to customize a template; and wherein the customized application is developed based at least in part on the customized template.

6. The customizable application system of claim 1, wherein the processing device is further configured to execute computer-readable program code to save the customized application on the memory device; and receive a request from the financial institution customer to view the customized application on a customer system.

7. The customizable application system of claim 1, wherein the processing device is further configured to execute computer-readable program code to save the customized application on a customer system memory device; and receive a request from a customer system to update the customized application.

8. The customizable application system of claim 1, wherein the processing device is further configured to execute computer-readable program code to access the financial institution customer data from the primary financial institution.

9. The customizable application system of claim 1, wherein the processing device is further configured to execute computer-readable program code to access the financial institution customer data from a secondary financial institution.

10. A method comprising:
    receiving a request from a financial institution customer to access financial institution customer data associated with financial accounts the customer has;
    determining account information associated with accounts within a primary financial institution;
    requesting financial institution customer data for accounts from one or more different financial institutions that the financial institution customer has identified as having an account associated therewith;
    receiving, automatically, based at least in part on the request for financial institution customer data from the one or more different financial institutions, account information for the accounts associated with the one or more different financial institutions;
    compiling the account information associated with the accounts within the primary financial institution and the account information received from one or more different financial institutions to create financial institution customer data for the customer;

comparing, using the financial institution customer data, a financial situation of the financial institution customer during a first time period with a financial situation of the financial institution customer during a second time period, wherein the first time period and the second time period are selected by the financial institution customer;

comparing the financial situation of the financial institution customer during the first time period with a financial situation of a group of other financial institution customers, wherein financial situation comparison includes a comparison between financial savings, a budget, and a cash flow of the financial institution customer and the group of other financial institution customers, wherein the first time period is selected by the financial institution customer;

initiating a presentation of a user interface to enable the financial institution customer to develop a customized application based at least in part on the financial institution customer data determined from account information from both the primary financial institution and one or more different financial institutions; and displaying the customized application to the customer.

11. The method of claim 10, further comprising receiving a request from the financial institution customer to add customized information; and wherein the customized application is developed based at least in part on the customized information.

12. The method of claim 11, wherein the customized information is a goal that the financial institution customer wants to track using the customized application.

13. The method of claim 10, further comprising receiving a request from the financial institution customer to utilize a template; and wherein the customized application is developed based at least in part on the template.

14. The method of claim 10, further comprising receiving a request from the financial institution customer to customize a template; and wherein the customized application is developed based at least in part on the customized template.

15. The method of claim 10, further comprising saving the customized application on a customized application system; and receiving a request from the financial institution customer to view the customized application on a customer system.

16. The method of claim 10, further comprising saving the customized application on a customer system; and receiving a request from the customer system to update the customized application.

17. The method of claim 10, further comprising accessing the financial institution customer data from the primary financial institution.

18. The method of claim 10, further comprising accessing the financial institution customer data from a secondary financial institution.

19. A computer program product, the computer program product comprising at least one non-transitory computer-readable medium having computer-readable program code portions embodied therein, the computer-readable program code portions comprising:

an executable portion configured for receiving a request from a financial institution customer to access financial institution customer data associated with financial accounts the customer has;

an executable portion configured for determining account information associated with accounts within a primary financial institution;

an executable portion configured for requesting financial institution customer data for accounts from one or more different financial institutions that the financial institution customer has identified as having an account associated therewith;

an executable portion configured for receiving, automatically, based at least in part on the request for financial institution customer data from the one or more different financial institutions, account information for the accounts associated with the one or more different financial institutions;

an executable portion configured for compiling the account information associated with the accounts within the primary financial institution and the account information received from one or more different financial institutions to create financial institution customer data for the customer;

an executable portion configured for comparing, using the financial institution customer data, a financial situation of the financial institution customer during a first time period with a financial situation of the financial institution customer during a second time period, wherein the first time period and the second time period are selected by the financial institution customer;

an executable portion configured for comparing the financial situation of the financial institution customer during the first time period with a financial situation of a group of other financial institution customers, wherein financial situation comparison includes a comparison between financial savings, a budget, and a cash flow of the financial institution customer and the group of other financial institution customers, wherein the first time period is selected by the financial institution customer;

an executable portion configured for initiating a presentation of a user interface to enable the financial institution customer to develop a customized application based at least in part on the financial institution customer data determined from account information from both the primary financial institution and one or more different financial institutions; and an executable portion configured for displaying the customized application to the customer.

20. The computer program product of claim 19, further comprising an executable portion configured for receiving a request from the financial institution customer to add customized information; and wherein the customized application is developed based at least in part on the customized information.

21. The computer program product of claim 20, wherein the customized information is a goal that the financial institution customer wants to track using the customized application.

22. The computer program product of claim 19, further comprising an executable portion configured for receiving a request from the financial institution customer to utilize a template; and wherein the customized application is developed based at least in part on the template.

23. The computer program product of claim 19, further comprising an executable portion configured for receiving a request from the financial institution customer to customize a template; and wherein the customized application is developed based at least in part on the customized template.

24. The computer program product of claim 19, further comprising an executable portion configured for saving the customized application on a customized application system; and an executable portion configured for receiving a request from the financial institution customer to view the customized application on a customer system.

25. The computer program product of claim 19, further comprising an executable portion configured for saving the customized application on a customer system; and an executable portion configured for receiving a request from the customer system to update the customized application.

26. The computer program product of claim 19, further comprising an executable portion configured for accessing the financial institution customer data from the primary financial institution.

27. The computer program product of claim 19, further comprising an executable portion configured for accessing the financial institution customer data from a secondary financial institution.

* * * * *